United States Patent
Takahashi et al.

(10) Patent No.: US 8,230,958 B2
(45) Date of Patent: Jul. 31, 2012

(54) VEHICLE SIDE COWL WITH HEAT EXHAUST DUCT

(75) Inventors: Kuniyuki Takahashi, Shizuoka (JP); Katsumitsu Wakamatsu, Shizuoka (JP)

(73) Assignee: Yamaha Hatsudoki Kabushiki Kaisha, Iwata-Shi (JP)

( * ) Notice: Subject to any disclaimer, the term of this patent is extended or adjusted under 35 U.S.C. 154(b) by 846 days.

(21) Appl. No.: 12/289,428

(22) Filed: Oct. 28, 2008

(65) Prior Publication Data

US 2009/0108629 A1 Apr. 30, 2009

(30) Foreign Application Priority Data

Oct. 31, 2007 (JP) ................................ 2007-284229

(51) Int. Cl.
*B60K 11/08* (2006.01)
*B60K 11/00* (2006.01)

(52) U.S. Cl. ..................................... 180/68.1

(58) Field of Classification Search ................ 180/68.1, 180/68.2, 68.6, 218, 219, 225, 229; 296/77.1, 296/78.1, 180.1, 208
See application file for complete search history.

(56) References Cited

U.S. PATENT DOCUMENTS

| | | | | |
|---|---|---|---|---|
| 4,678,223 A | * | 7/1987 | Kishi et al. | 296/78.1 |
| 4,685,530 A | * | 8/1987 | Hara | 180/219 |
| 4,913,256 A | * | 4/1990 | Sakuma | 180/229 |
| 6,709,042 B2 | * | 3/2004 | Takemura et al. | 296/78.1 |
| 7,399,029 B2 | * | 7/2008 | Takeshita | 296/203.01 |
| 7,410,025 B2 | * | 8/2008 | Sunaguchi et al. | 180/229 |
| 7,503,609 B2 | * | 3/2009 | Misaki et al. | 296/37.1 |
| 7,513,328 B2 | * | 4/2009 | Shigeta et al. | 180/225 |
| 7,556,115 B2 | * | 7/2009 | Iwanaga | 180/229 |
| 7,850,221 B2 | * | 12/2010 | Nakata et al. | 296/78.1 |
| 2008/0012391 A1 | * | 1/2008 | Nakata et al. | 296/208 |

FOREIGN PATENT DOCUMENTS

| JP | 09-076967 | 3/1997 |
|---|---|---|
| JP | 2001-080559 | 3/2001 |

OTHER PUBLICATIONS

2006 Yamaha YZF-R6 Owner's Manual, p. 6-6 thru p. 6-9, first edition—published 2006, Yamaha Motor Co.*
2006 YZFR6 Service Manual, p. 4-3, second edition—published May 2007, Yamaha Motor Co.*

* cited by examiner

*Primary Examiner* — J. Allen Shriver, II
*Assistant Examiner* — Travis Coolman
(74) *Attorney, Agent, or Firm* — Rabin & Berdo, P.C.

(57) ABSTRACT

A vehicle cowl may be arranged on a side portion of a vehicle, and include a duct that extends in a vehicle width direction. The duct may have an inside opening and an outside opening. The inside opening may face inward, toward the vehicle body, and the outside opening may face outward from the vehicle. The cowl may further include a panel for covering a portion of the outside opening. The panel may be arranged so that, when the vehicle is viewed from the front, a portion of the outside opening left uncovered by the panel is shielded by a forward part of the panel, and thus not visible. The vehicle may be a motorcycle.

20 Claims, 6 Drawing Sheets

VEHICLE SIDE COWL WITH HEAT EXHAUST DUCT

CROSS-REFERENCE TO RELATED APPLICATION

This application claims priority under 35 U.S.C. §119 from Japanese Patent Application No. 2007-284229, filed Oct. 31, 2007, the entirety of which is incorporated herein by reference.

BACKGROUND OF THE INVENTION

1. Technical Field

Embodiments of the present invention relate generally to a cowl for a vehicle, such as a motorcycle. More particularly, the embodiments relate to a cowl structure that covers a side portion of a motorcycle and includes a duct to exhaust heat.

2. Background Art

Vehicle cowls (e.g., exterior covers) with an opening for exhausting heat are known. For example, a motorcycle cowl may be arranged on the side of the motorcycle, and exhaust heat generated by heat generating parts such as a radiator, an engine, an air exhaust pipe, and the like. Conventionally, a side cowl has a depression formed on its surface and extending from the exhaust opening toward a rear of the motorcycle. In this way, a negative pressure is produced in the opening to form an air flow going from the inside of the cowl to the outside of the cowl.

SUMMARY OF THE INVENTION

In a vehicle cowl according to embodiments of the present invention, a duct may be arranged on a side portion of the vehicle, and extend in a vehicle width direction (e.g., a side-to-side direction substantially transverse to a front-to-rear direction of the vehicle). The duct may have an inside opening and an outside opening. The inside opening may face inward, toward the vehicle body, and the outside opening may face outward from the vehicle. The cowl may further include a panel for covering a portion of the outside opening. The panel may be arranged so that, when the vehicle is viewed from the front, a portion of the outside opening left uncovered by the panel is shielded by a forward part of the panel, and thus not visible. The vehicle may be a motorcycle.

The inside opening and the portion of the outside opening left uncovered by the panel may form an inlet and an outlet, respectively, of a heat exhaust channel that flares outward from the inside opening to the outside opening in the vehicle width direction. The panel may be curved and extend partly over the outside opening, in such a way that heated air is directed away from the vehicle in a sideward and rearward direction.

DETAILED DESCRIPTION OF THE INVENTION

The invention will now be described in more detail by way of example with reference to the embodiments shown in the accompanying Figures. It should be kept in mind that the following described embodiments are only presented by way of example and should not be construed as limiting the inventive concept to any particular physical configuration.

Further, if used and unless otherwise stated, the terms "upper," "lower," "front," "back," "over," "under," and similar such terms are not to be construed as limiting the invention to a particular orientation. Instead, these terms are used only on a relative basis.

Moreover, any term of degree used herein, such as "substantially", "essentially" and "nearly", means a reasonable amount of deviation of the modified word is contemplated such that the end result is not significantly changed. For example, such terms can be construed as allowing a deviation of at least 5% of the modified word if this deviation would not negate the meaning of the word the term of degree modifies.

Figure 1:
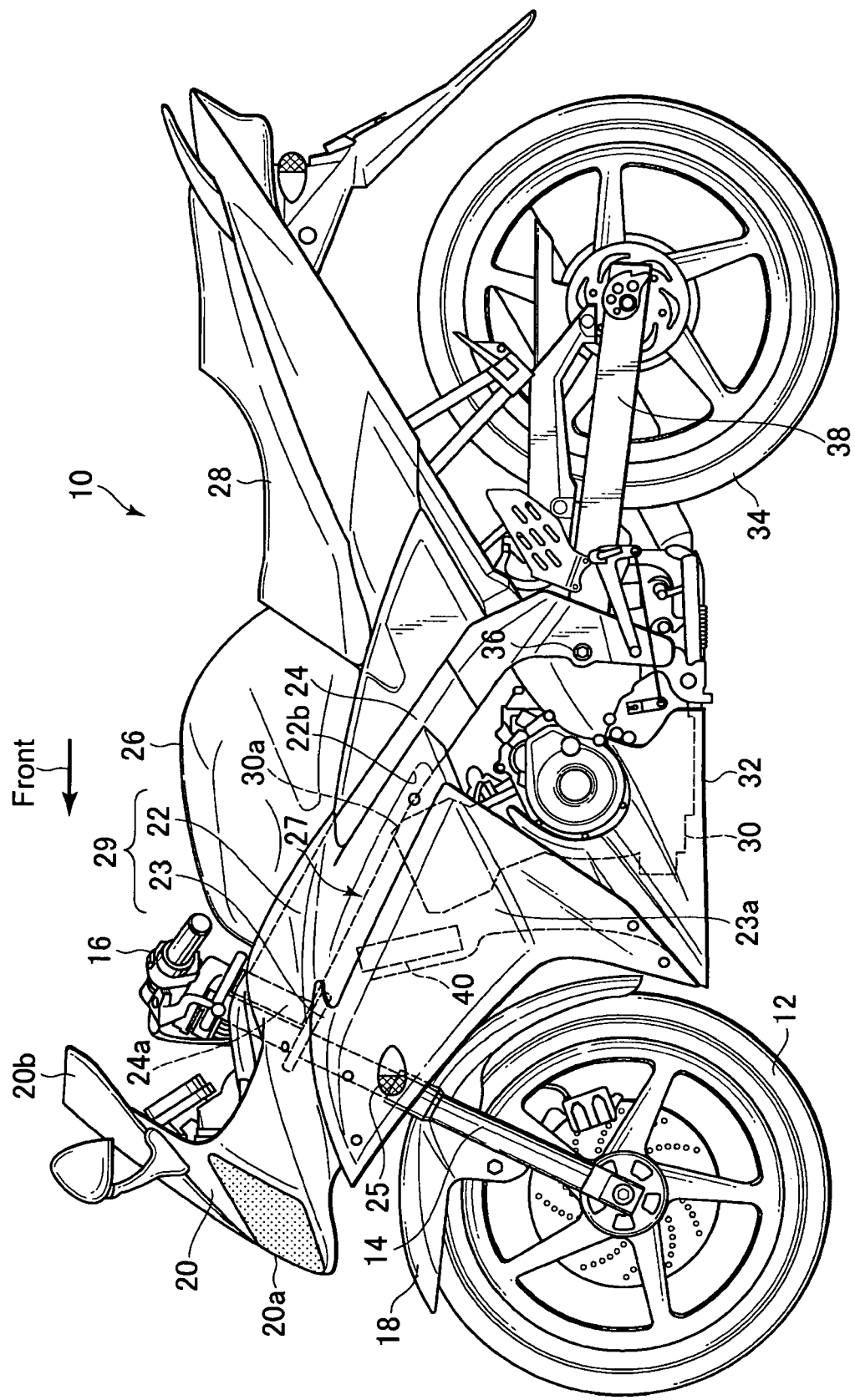
FIG. 1 is a side view of an example of a vehicle, specifically, a motorcycle, according to embodiments of the present invention.

Referring now to FIG. 1, a vehicle 10, for example a motorcycle, according to embodiments of the present invention is shown. The motorcycle 10 may include a front fork 14 for rotatably supporting the axle of a front wheel 12. The motorcycle 10 may further include a handlebar 16 fixed to a top portion thereof. The front wheel 12 can be operated to the left and right by the handlebar 16. The front fork 14 may have a fender 18 fixed thereto, the fender 18 covering the upper portion of the front wheel 12. A front cowl 20 including a head light 20a and a windbreak plate 20b may be disposed forward of the handlebar 16.

A head pipe 24a for supporting the handlebar 16 may be arranged downward of the handlebar 16, and a pair of left and right vehicle body frames 24, 24 may extend rearward and downward from the head pipe 24a. A fuel tank 26 may be disposed upward of the vehicle body frames 24, 24, and a rider's seat 28 may be disposed rearward of the fuel tank 26. An engine 30 driven, for example, by gasoline supplied from the fuel tank 26 may be suspended from the vehicle body frames 24, 24. A lower portion of the engine 30 may be covered by an under cowl 32.

The drive force of the engine 30 may be transmitted to a rear wheel 34 via a chain (not shown). The rear wheel 34 may include an axle supported by a swing arm 38 supported by a pivot 36 so as to be freely swung, the pivot 36 being disposed in rear end portions of the vehicle body frames 24, 24. The foregoing structure can enable the motorcycle 10 to be driven forward while allowing the rear wheel 34 to move up and down responsively to a road surface. A radiator 40 may be disposed forward of the engine 30 so as to face forward of the vehicle. The radiator 40 may cool cooling water of the engine 30 by the "running wind," i.e., a flow of air over the motorcycle due to a forward motion of the motorcycle.

Figure 2:
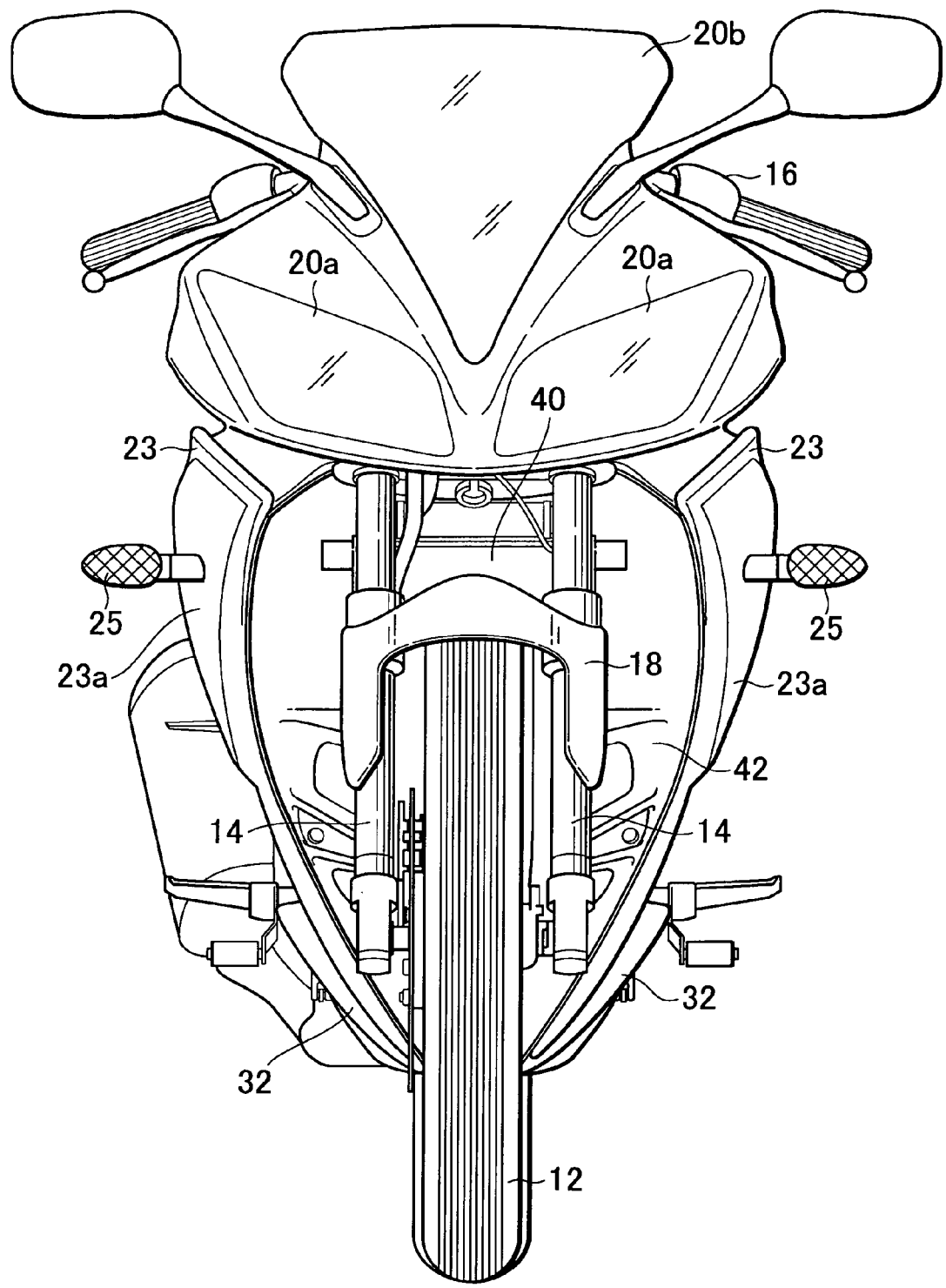
FIG. 2 is a front view of the motorcycle according to embodiments of the present invention.
Figure 4:
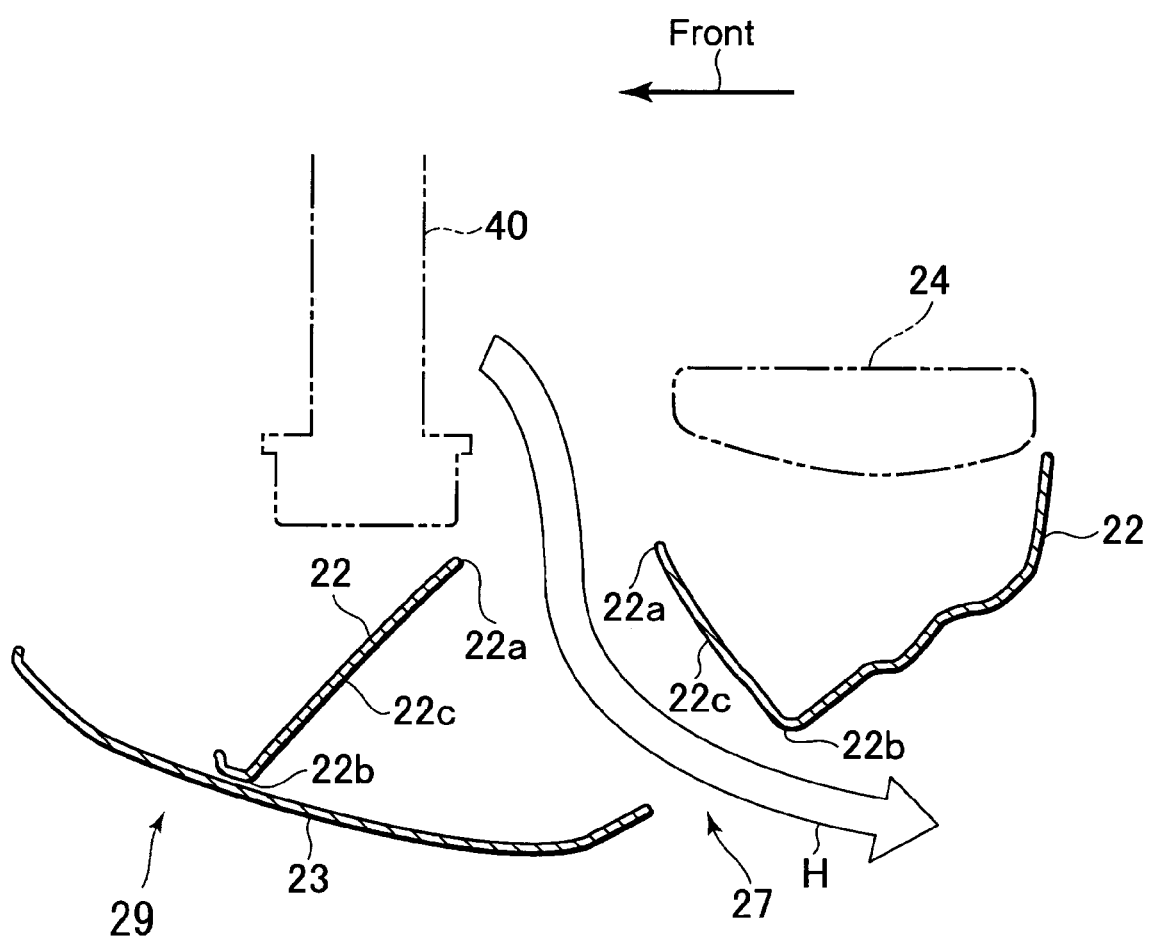
FIG. 4 is a sectional view taken along line IV-IV shown in FIG. 3.
Figure 5:
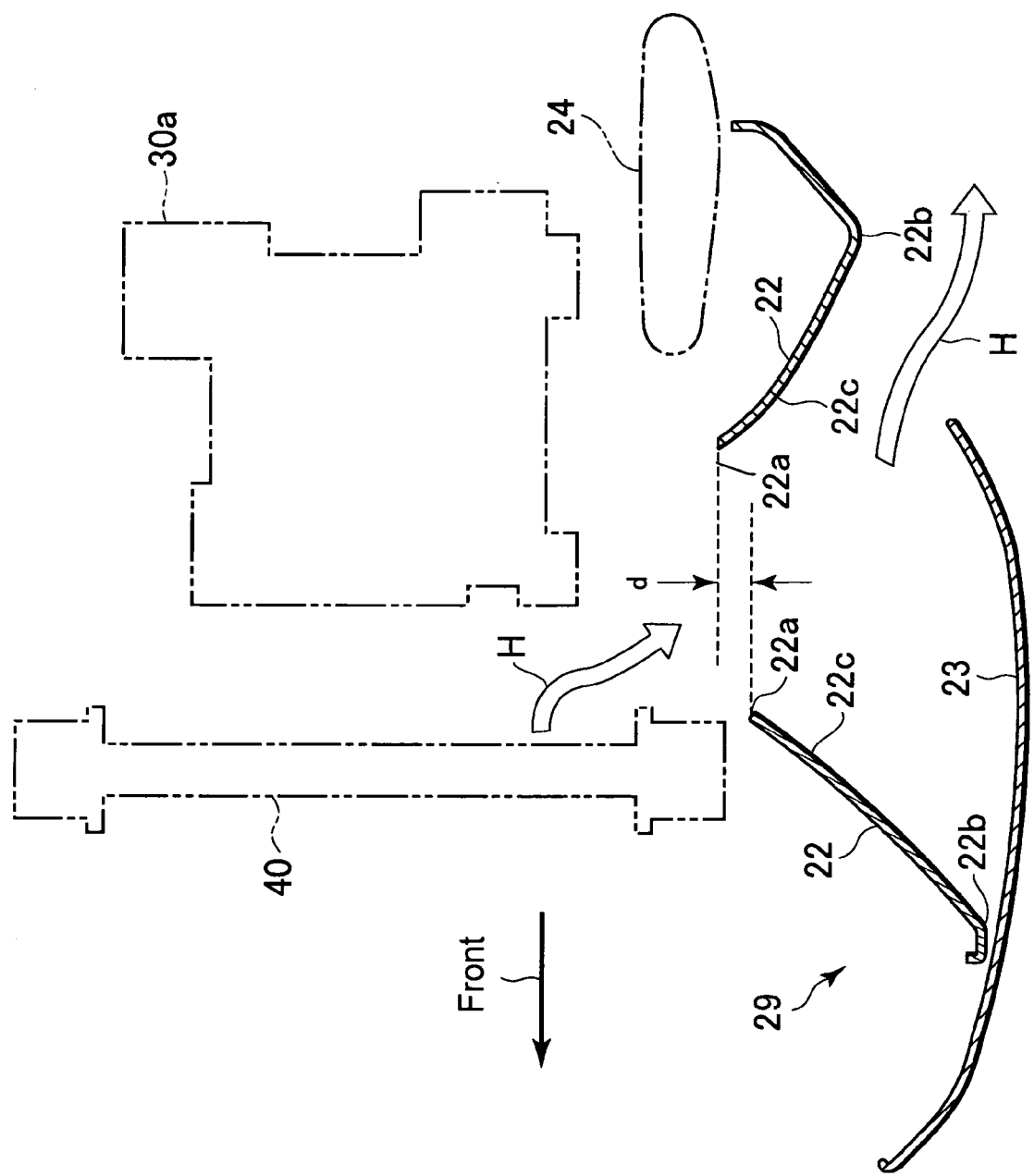
FIG. 5 is a sectional view taken along line V-V shown in FIG. 3.

The motorcycle 10 may further include a side cowl 29. The side cowl 29 may include an inner side cowl 22 and an outer side cowl or panel 23. As shown in FIG. 2, an outer side cowl 23 may be arranged on both sides of the motorcycle. As better seen in FIGS. 4 and 5, the outer side cowl 23 may be a curved component that partly covers an outside opening 22b of the inner side cowl 22. The inner side cowl 22 may further include an inside opening 22a that faces toward the vehicle body or frame, and toward heat-generating parts of the motorcycle, such as the radiator 40 and engine 30. The inside opening 22a may form an inlet of a heat exhaust channel or duct 22c that flares outward from the inside opening 22a to the outside opening 22b in a vehicle width direction. The duct 22c may direct heated air away from the vehicle in a sideward and rearward direction, as shown in FIGS. 4 and 5.

Figure 3:
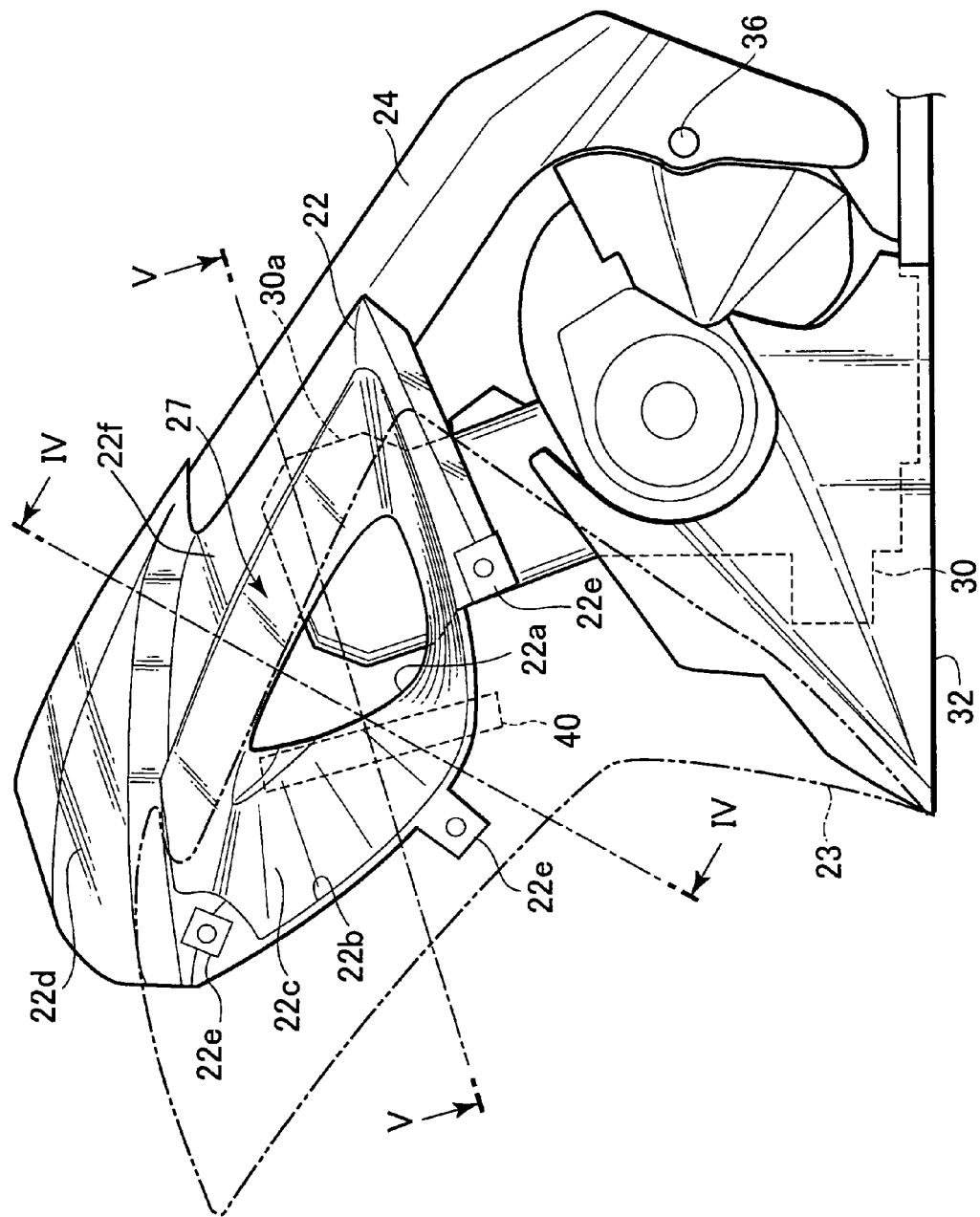
FIG. 3 is an enlarged view of a side cowl according to embodiments of the present invention.

In embodiments, the inner side cowl 22 and the outer side cowl 23 may be separate components. The inner side cowl 22 and the outer side cowl 23 may be formed, for example, from a material capable of being molded, such as a plastic or resin. Referring now to FIG. 3, a fixing seat 22e molded on the inner side cowl 22 may be fixed to the inside of the outer side cowl 23 by a fastener, such as a bolt, whereby both side cowls 22, 23 may be integrally fixed. As shown in FIG. 2, the outer side cowl 23 may have flashers 25, 25 fixed thereto.

Again referring to FIG. 3, and as mentioned previously, the inner side cowl 22 may include a duct 22c. The duct 22c may be integrally molded into the inner side cowl 22 (e.g., the inner side cowl 22 may be a single, unitary piece with the duct 22c shape molded into it). The duct 22c may flare outward in a side-to-side or vehicle width direction, from the inside opening 22a opposite the vehicle body, to the outward-facing outside opening 22b. The outside opening 22b may be larger than the inside opening 22a. As better seen in FIGS. 4 and 5, the inside opening 22a may be positioned inward of the outside opening 22b, and face heat-generating parts such as a radiator 40 and engine 30.

Referring again to FIG. 3, an edge portion $22f_{[B1]}$ may extend from a peripheral edge of the outside opening 22b, and an upper portion of the edge portion 22f may cover a portion of the vehicle body frame 24 when the motorcycle 10 is viewed from the side. The inside opening 22a may be formed in a shape that extends downward and rearward, with respect to the vehicle, along the vehicle body frame 24. The inside opening 22a may have an upper edge positioned below a bottom surface of the vehicle body frame 24. The outside opening 22b may have a similar shape to that of the inside opening 22a, that is, may be formed in a shape that extends downward and rearward, with respect to the vehicle, along the vehicle body frame 24. The outside opening 22b may have an upper edge positioned above the bottom surface of the vehicle body frame 24. With the structure described in the foregoing, heated air from the engine 30 and the radiator 40 can be smoothly guided around the vehicle body frame 24 by the duct 22c.

Moreover, as shown in FIG. 3 and FIG. 5, the inside opening 22a of the inner side cowl 22 may face the engine 30, and more specifically, onto a region between a cylinder head 30a and the radiator 40. Therefore, heated air from the engine 30 and the radiator 40 can be quickly introduced into the inside opening 22a. Further, as shown in FIG. 5, the inside opening 22a may have its edge on the rear side of the vehicle positioned a distance d further inward, toward the engine 30, than its edge on the front side of the vehicle. That is, the inside opening 22a may be inclined inward toward heat generating components such as the radiator 40 and engine 30. Thus, the running wind can be smoothly taken into the inside opening 22a to form an air flow passing through the duct 22c along a path indicated by arrows H.

As seen in FIGS. 4 and 5, in cross-section the outer side cowl or panel 23 may have a curved shape and extend over a portion of the outside opening 22b of the duct 22c. As seen in FIG. 2, from a front view the outer side cowl 23 may curve upward from a lower portion of the motorcycle 10, and include a step 23a where the outer side cowl 23 flares outward in a vehicle width direction.

Additionally, as seen in FIG. 1, the outer side cowl 23 may be arranged at a position shifted further forward and downward, with respect to the motorcycle 10, than the inner side cowl 22. In this position, as seen in FIG. 3, the outer side cowl 23 may cover a portion of the outside opening 22b that is forward and downward with respect to the motorcycle 10. Thus, a portion of the outside opening 22b not covered by the outer side cowl 23, that is, a portion rearward and upward with respect to the motorcycle 10, may be exposed. This exposed portion may act as an outlet or exhaust port 27 for heated air from the engine 30 and the radiator 40 (see also FIGS. 1 and 4).

An upper edge of the outer side cowl 23 may extend rearward and downward along the vehicle body frame 24. As described above, the upper edge of the outside opening 22b of the inner side cowl 22 may also extend rearward and downward along the vehicle body frame 24. Thus, the exhaust port 27 may likewise extend rearward and downward along the vehicle body frame 24. Because the exhaust port 27 can be formed as described, it can be offset from the vehicle body frame 24 and be made larger, thereby more effectively exhausting heated air.

As seen in FIGS. 1 and 2, the step 23a of the outer side cowl 23 may be formed in front of the exhaust port 27. Thus, when the motorcycle 10 is viewed from the front, the exhaust port 27 may be completely shielded and hidden by the step 23a. With this structure, because the outer side cowl 23 can shield the exhaust port 27 when the motorcycle 10 is moving forward, a negative pressure can be produced near the exhaust port 27 by the running wind, to easily exhaust heated air from the engine 30 and the radiator 40.

Figure 6:
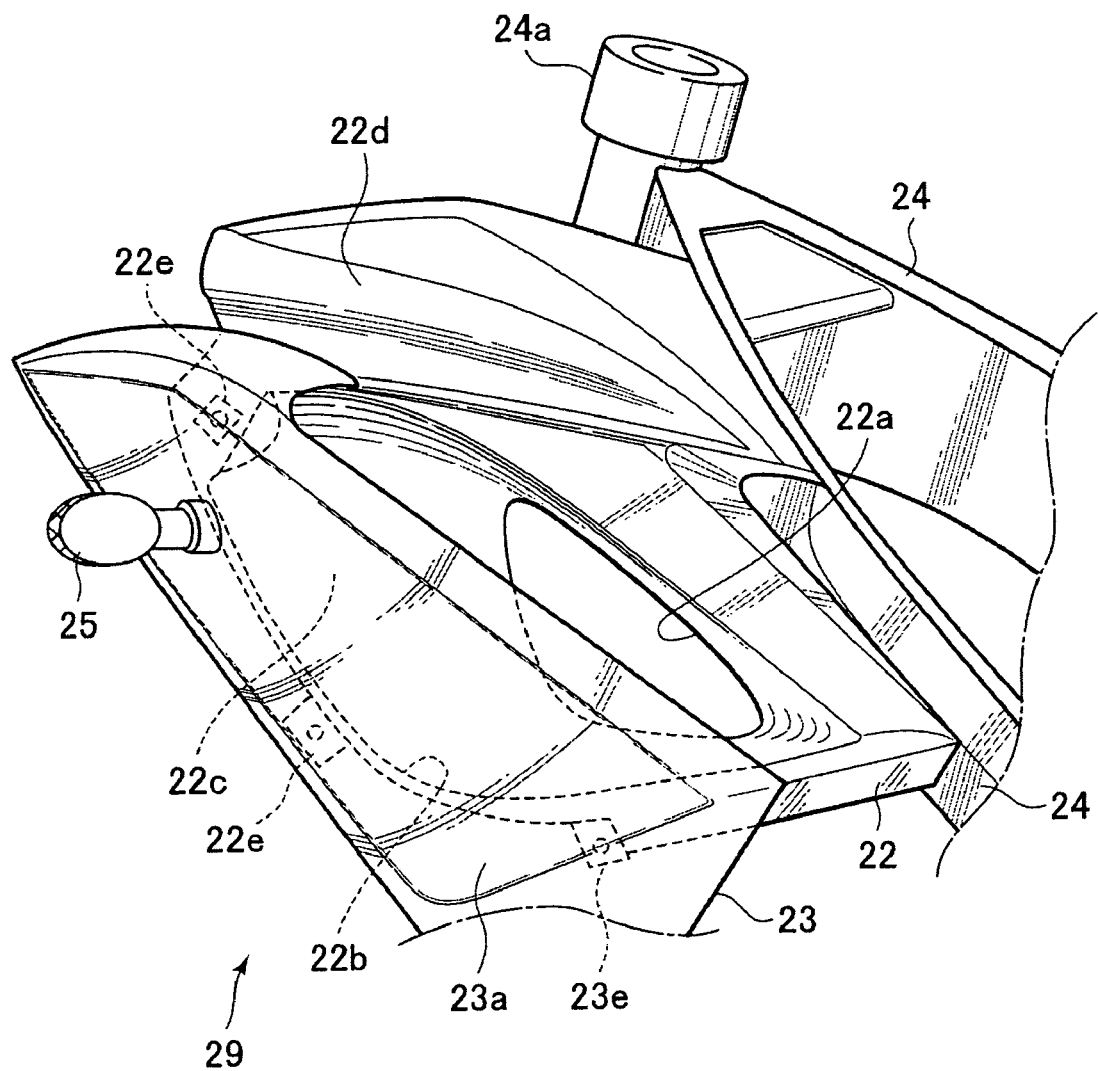
FIG. 6 is an enlarged perspective view the side cowl according to embodiments of the present invention.

Referring now to FIGS. 3 and 6, a depression 22d extending from the edge portion 22f in a front-to-rear direction may be formed in the inner side cowl 22, in front of the exhaust port 27. This structure can create a high-speed air flow through the depression 22d, to quickly transport heated air exhausted from the exhaust port 27 in a rearward direction.

The structures described in the above have advantages. For example, because the outer side cowl 23 can shield the exposed portion of the outside opening 22b of the duct 22c when the motorcycle 10 is moving forward, sufficient negative pressure can be produced around the exhaust port 27 by the running wind to effectively exhaust heated air from the motorcycle 10. Moreover, because the inner side cowl 22 can be formed so as to extend in the vehicle width direction and can be protected by the outer side cowl 23, the side cowl 29 as a whole can be strong and durable.

It will be apparent to one skilled in the art that the manner of making and using the claimed invention has been adequately disclosed in the above-written description of the preferred embodiments taken together with the drawings.

It will be understood that the above description of the preferred embodiments of the present invention are susceptible to various modifications, changes and adaptations, and the same are intended to be comprehended within the meaning and range of equivalents of the appended claims.

The invention claimed is:

1. A vehicle cowl for a vehicle, comprising:
a duct to be arranged on a side portion of the vehicle and to extend in a vehicle width direction,
when the duct is viewed perpendicularly to a substantially horizontal plane the duct includes a pair of sides that includes a first side and a second side, as the duct extends towards an interior of the vehicle along the vehicle width direction the first side extends towards a rear of the vehicle and the second side extends towards a front of the vehicle such that the first side and the second side converge towards each other, the duct forming an inside opening at a first end of each of the pair of sides to face a vehicle body, and an outside opening to face outward from the vehicle at a second end of each of the pair of sides; and a panel to cover a portion of the outside opening, wherein a portion of the outside opening not covered by the panel is to be shielded by the panel when the vehicle is viewed from a front thereof.

2. The vehicle cowl of claim 1, wherein the duct and the panel are separate parts.

3. The vehicle cowl of claim 1, wherein the duct is a single, integrally molded part.

4. The vehicle cowl of claim 1, wherein the outside opening is larger than the inside opening.

5. The vehicle cowl of claim 1, wherein when the cowl is in place on a vehicle, the inside opening is inclined in a cross-sectional view.

6. The vehicle cowl of claim 1, wherein when the cowl is in place on a vehicle, the inside opening faces a region between an engine mounted in the vehicle and a radiator arranged forward of the engine for cooling engine cooling water.

7. The vehicle cowl of claim 1, wherein the vehicle is a motorcycle that includes a vehicle body frame including left and right frames extending rearward and downward from a head pipe, and wherein, when the cowl is in place on the motorcycle, an upper edge of the inside opening is positioned below a bottom surface of the vehicle body frame and an upper edge of the outside opening is positioned above the bottom surface of the vehicle body frame.

8. The vehicle cowl of claim 7, wherein the upper edge of the inside opening extends rearward and downward.

9. The vehicle cowl of claim 7, wherein the upper edge of the outside opening extends rearward and downward.

10. The vehicle cowl of claim 7, wherein the portion of the outside opening not covered by the panel is formed in a shape that extends rearward and downward.

11. The vehicle cowl of claim 1, wherein when the cowl is in place on a vehicle, the panel curves outward in the vehicle width direction.

12. A vehicle including the cowl as recited in claim 1.

13. The vehicle of claim 12, wherein the vehicle is a motorcycle.

14. A motorcycle side cowl, comprising:

a heat exhaust channel having a first end encircling an inside opening for facing a heat-generating part of the motorcycle, and a second end encircling an outside opening; and a curved panel to extend partly over the outside opening, wherein when the cowl is in place on a motorcycle, the heat exhaust channel flares outward in a vehicle width direction, from the inside opening to the outside opening, and a portion of the outside opening left exposed by the panel forms an exhaust port for heated air.

15. The motorcycle side cowl of claim 14, wherein the side cowl directs heated air in a sideward and rearward direction.

16. The motorcycle side cowl of claim 14, wherein the heat exhaust channel and the panel are separate, molded components.

17. The motorcycle side cowl of claim 14, wherein the panel includes a portion that flares outward in the vehicle width direction when the cowl is in place on a motorcycle.

18. A motorcycle including a side cowl as recited in claim 14.

19. A vehicle cowl for a vehicle, comprising:

duct means extending in a vehicle width direction and including a pair of sides that includes a first side and a second side, the duct means for directing heated air away from the vehicle, the first side being arranged further forward of the vehicle relative to the second side, the second side extending further towards an interior of the vehicle than the first side; and panel means for covering a portion of an outside opening of the duct means, wherein the panel means shields a portion of the outside opening left uncovered when the vehicle is viewed from a front thereof.

20. The vehicle cowl of claim 19, wherein the duct means includes an inside opening for facing a heat-generating part of the vehicle.

* * * * *